(12) United States Patent
Park et al.

(10) Patent No.: US 8,330,917 B2
(45) Date of Patent: Dec. 11, 2012

(54) THIN FILM TRANSISTOR SUBSTRATE AND LIQUID CRYSTAL DISPLAY HAVING THE SAME

(75) Inventors: Jin-Hee Park, Seoul (KR); Sun-Hyung Choi, Hwaseong-si (KR); Jeong-Geun Yoo, Yongin-si (KR)

(73) Assignee: Samsung Display Co., Ltd. (KR)

( * ) Notice: Subject to any disclaimer, the term of this patent is extended or adjusted under 35 U.S.C. 154(b) by 516 days.

(21) Appl. No.: 12/618,660

(22) Filed: Nov. 13, 2009

(65) Prior Publication Data

US 2010/0177256 A1    Jul. 15, 2010

(30) Foreign Application Priority Data

Jan. 9, 2009    (KR) .......................... 10-2009-0002007

(51) Int. Cl.
*G02F 1/1343* (2006.01)
(52) U.S. Cl. ........................... 349/139; 349/143; 349/43
(58) Field of Classification Search ..................... 349/43, 349/139, 38, 106, 128, 129, 143, 42, 110, 349/111
See application file for complete search history.

(56) References Cited

U.S. PATENT DOCUMENTS

| | | | | |
|---|---|---|---|---|
| 5,966,190 | A * | 10/1999 | Dohjo et al. | 349/39 |
| 6,249,326 | B1 * | 6/2001 | Hebiguchi | 349/42 |
| 6,335,776 | B1 * | 1/2002 | Kim et al. | 349/129 |
| 7,110,075 | B2 * | 9/2006 | Tak et al. | 349/129 |
| 7,382,428 | B2 * | 6/2008 | Lai et al. | 349/129 |
| 2008/0018815 | A1 * | 1/2008 | Choi et al. | 349/37 |

* cited by examiner

*Primary Examiner* — Thoi Duong
(74) *Attorney, Agent, or Firm* — Innovation Counsel LLP

(57) ABSTRACT

A thin film transistor (TFT) substrate that may not have display quality degradation due to an image sticking phenomenon and a liquid crystal display having the same are disclosed for embodiments. The TFT substrate, according to one embodiment of the present invention, includes an insulating substrate, a plurality of gate lines and a plurality of data lines arranged in a matrix defined by the crossing of the gate lines and the data lines on the insulating substrate, a plurality of thin film transistors each electrically connected to the gate lines and of the data lines at crossing points of the gate lines and the data lines, a plurality of pixel electrodes each connected to the thin film transistors and partially overlapping a previous gate line, and a blocking electrode formed between each pixel electrode and its adjacent pixel electrode in parallel with the gate lines.

36 Claims, 9 Drawing Sheets

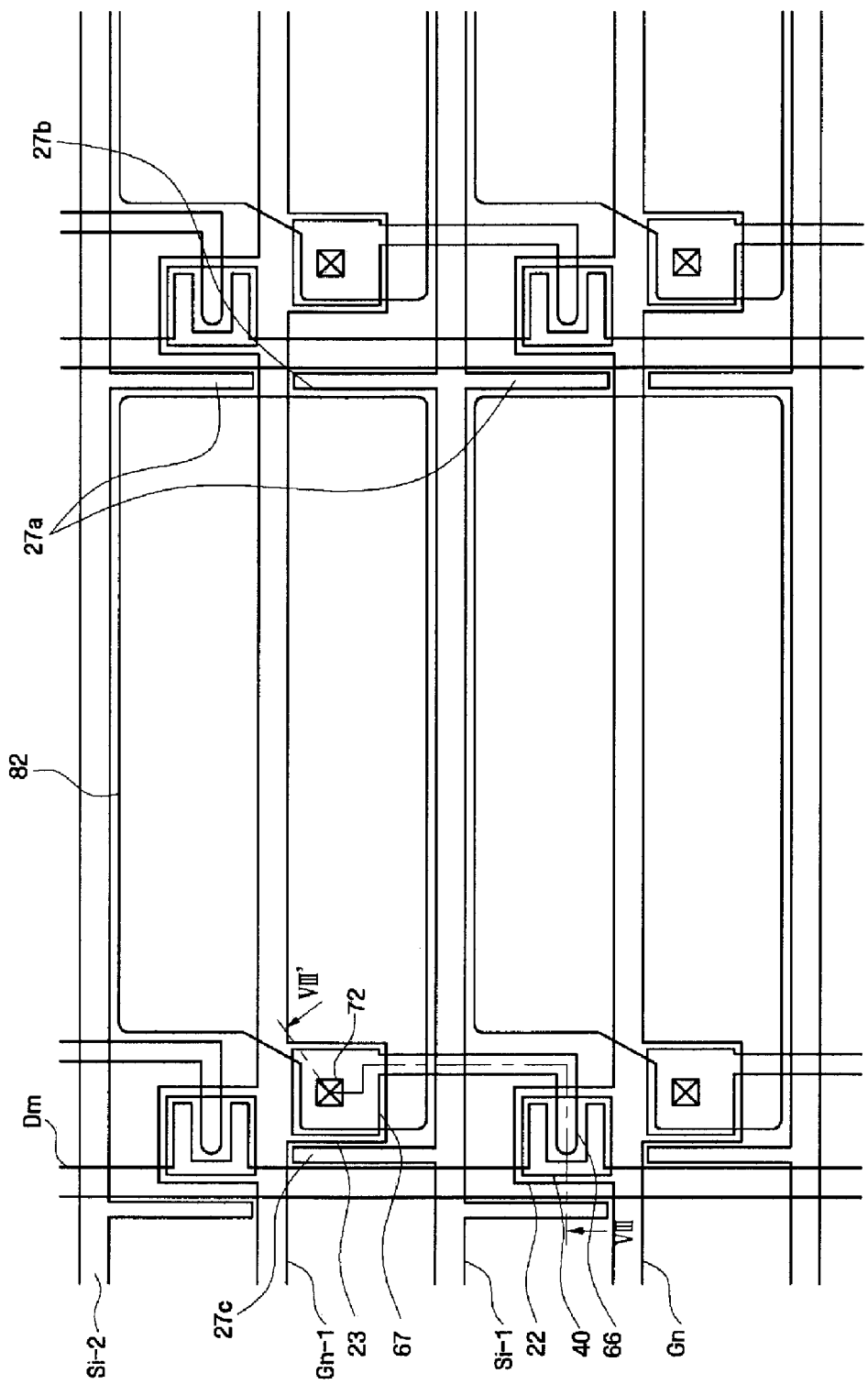

THIN FILM TRANSISTOR SUBSTRATE AND LIQUID CRYSTAL DISPLAY HAVING THE SAME

CROSS-REFERENCE TO RELATED APPLICATIONS

This application claims priority to and benefit of Korean Patent Application No. 10-2009-0002007, filed on Jan. 9, 2009, in the Korean Intellectual Property Office, the disclosure of which is incorporated herein by reference in its entirety.

BACKGROUND

1. Technical Field

The present invention relates to a thin film transistor (TFT) substrate and a liquid crystal display (LCD) having the same, and more particularly, to a TFT substrate, which may not have display quality degradation due to an image sticking phenomenon, and a liquid crystal display having the same.

2. Related Art

With the recent trend for large-screen size display devices, such as TVs, a flat panel display apparatus, such as a liquid crystal display (LCD), a plasma display panel (PDP), and an organic light emitting diode (OLED), has been developed to substitute for a conventional display, such as a cathode ray tube (CRT). Particularly, the LCD, which is a widely used type of flat panel display, is currently receiving increased attention because of a large-screen size and a slim profile.

Generally, the LCD includes an upper substrate having a common electrode, color filters, and black matrixes, and a lower substrate having thin film transistors (TFTs), and pixel electrodes. Liquid crystal material having an anisotropic dielectric index is injected into a layer between the lower substrate and the upper substrate. Voltages of different potentials are applied to the pixel and common electrodes of the lower and upper substrates to form electric fields such that the alignment of liquid crystal molecules of the liquid crystal material is varied. Accordingly, the transmittance of incident light is controlled to enable the display of a desired image.

As the resolution of the LCD increases, the number of data lines and driver chips also increases, which may increase the manufacturing cost of the LCD and increase the size of the LCD, which makes the LCD appear bulky.

To solve these problems, there has been suggested a method in which the longer side of a pixel is divided in a transverse direction and red (R), green (G), and blue (B) color filters are arranged in a horizontal stripe configuration. Accordingly, the number of data driver chips can be considerably reduced, which can reduce manufacturing cost.

However, when column inversion driving of the LCD having the aforementioned configuration is performed for the purpose of reducing power consumption, image sticking may occur at a boundary between neighboring pixel electrodes because control of liquid crystal between the neighboring pixel electrodes is unstable. Here, it is to be understood that such image sticking may also occur in alternative inversion driving of the LCD other than the column inversion driving. Accordingly, the image sticking that occurs at the boundary between neighboring pixel electrodes may deteriorate display quality.

SUMMARY

Embodiments of the present invention provide a thin film transistor (TFT) substrate that may not have display quality degradation due to an image sticking phenomenon. Embodiments of the present invention provide a liquid crystal display (LCD) having a TFT substrate that may not have display quality degradation due to an image sticking phenomenon. These and other aspects of embodiments of the present invention are described herein or are apparent from the following description of embodiments.

According to an embodiment of the present invention, a TFT substrate includes an insulating substrate, a plurality of gate lines and a plurality of data lines arranged in a matrix defined by the crossing of the gate lines and the data lines on the insulating substrate, a plurality of thin film transistors each electrically connected to the gate lines and of the data lines at crossing points of the gate lines and the data lines, a plurality of pixel electrodes each connected to the thin film transistors and partially overlapping a previous gate line, and a blocking electrode formed between each pixel electrode and its adjacent pixel electrode in parallel with the gate lines.

According to another embodiment of the present invention, a liquid crystal display (LCD) includes a first insulating substrate, a plurality of gate lines and a plurality of data lines arranged in a matrix defined by the crossing of the gate lines and the data lines on the first insulating substrate, a plurality of thin film transistors each electrically connected to the gate lines and of the data lines at crossing points of the gate lines and the data lines, a plurality of pixel electrodes each connected to the thin film transistors and partially overlapping a previous gate line, a blocking electrode formed between each pixel electrode and its adjacent pixel electrode in parallel with the gate lines, a second insulating substrate disposed to face the first insulating substrate, a common electrode formed on the second insulating substrate, and a liquid crystal layer interposed between the first insulating substrate and the second insulating substrate.

BRIEF DESCRIPTION OF THE DRAWINGS

The above and other features and advantages of embodiments of the present invention will become more apparent by describing in detail various embodiments thereof with reference to the attached drawings in which:

FIG. 7 is a layout view of a TFT substrate, according to another embodiment of the present invention.

DETAILED DESCRIPTION

Figure 1:
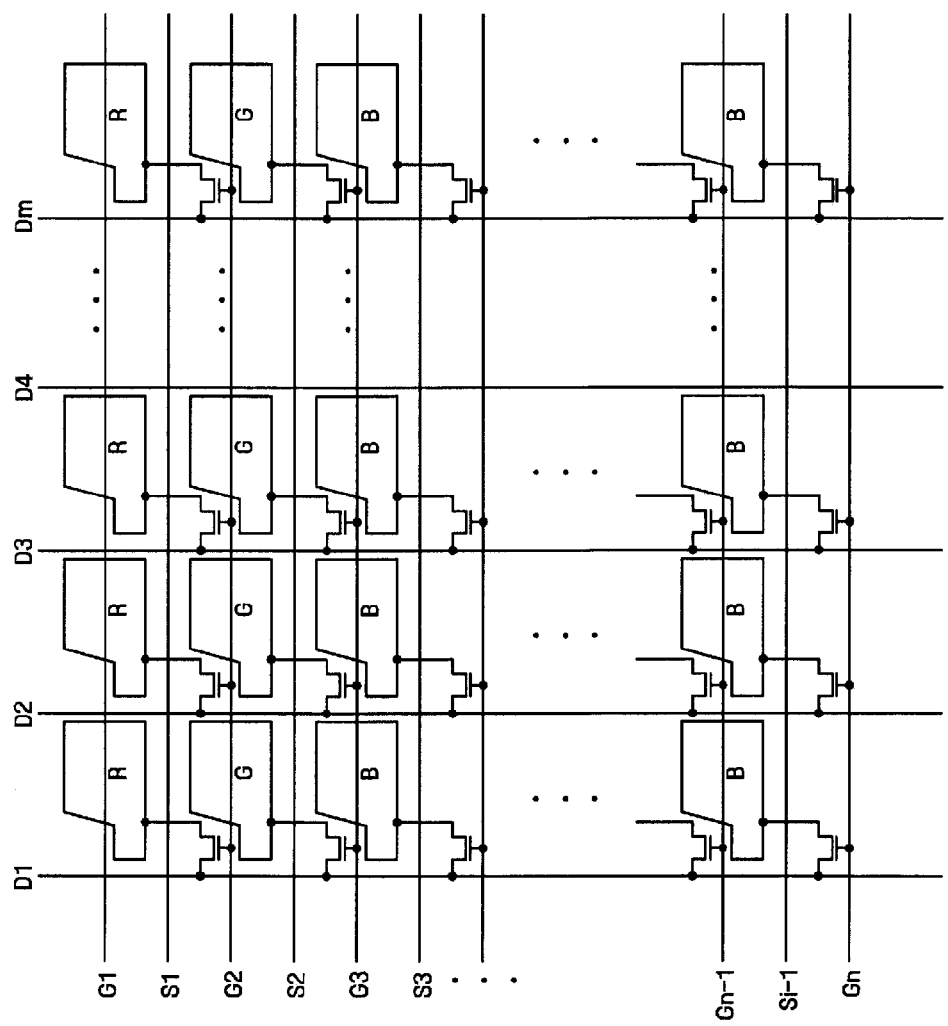
FIG. 1 is a schematic diagram of a pixel array of a liquid crystal display, according to an embodiment of the present invention.

Advantages and features of embodiments of the present invention and methods of accomplishing the same may be understood more readily by reference to the following detailed description of various embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout the specification.

Hereinafter, a liquid crystal display (LCD), according to an embodiment of the present invention, will be described with reference to FIGS. 1 through 6B. First, a pixel array of the LCD will be described with reference to FIG. 1, schematically showing a pixel array of the LCD, according to an embodiment of the present invention.

In the LCD, according to an embodiment of the present invention, each of pixels R, G, and B is elongated in a horizontal direction and has red (R), green (G), and blue (B) color filters sequentially arranged in a longitudinal direction. In particular, a liquid crystal panel includes a plurality of gate lines G1 to Gn and a plurality of data lines D1 to Dm arranged in a matrix defined by the crossing of the gate and data lines, and a plurality of pixels R, G, and B in a matrix shape along the gate and data lines. Here, the liquid crystal panel includes a TFT substrate and a common electrode substrate facing each other.

The TFT substrate includes a plurality of gate lines G1 to Gn and a plurality of data lines D1 to Dm extending in a longitudinal direction. The gate lines G1 to Gn are spaced a predetermined distance apart from one another and are arranged in parallel with one another. The data lines D1 to Dm are arranged to cross the gate lines G1 to Gn, respectively, and are spaced a predetermined gap apart from one another to be arranged in parallel with one another. Here, the distance between each of the gate lines G1 to Gn is smaller than the gap between each of the data lines D1 to Dm. Accordingly, the matrix defined by the crossing of the gate lines G1 to Gn and the data lines D1 to Dm may be a rectangular shape, which is long in a horizontal direction.

Each pixel (R, G, B) of the LCD represents one of red, green, or blue colors, and a dot is formed by a combination of red, green, and blue pixels. Each pixel (R, G, B) has a longer length in a horizontal direction than in a vertical direction, providing a horizontal stripe shape. Red, green, and blue color filters are sequentially and repeatedly arranged along the data lines D1 to Dm, thereby forming a dot in a longitudinal direction in units of three pixels, i.e., R, G, and B pixels.

The RGB pixels of three primary colors form one dot as a basic unit of an image. In one aspect, as described above, each pixel (R, G, B) is formed to have a longer horizontal length than a vertical length, thereby advantageously increasing the number of data lines D1 to Dm. Along with the tendency of increasing a horizontal length in the aperture ratio of an LCD, the number of data lines D1 to Dm is increased, which unavoidably increases the number of data driver chips for applying data voltages to the respective data lines D1 to Dm. In this case, each pixel (R, G, B) is elongated in a horizontal direction, thereby reducing the number of data lines D1 to Dm relative to the number of gate lines G1 to Gn while increasing the number of gate lines G1 to Gn relative to the number of data lines D1 to Dm. Accordingly, the numbers of the data lines D1 to Dm and the gate lines G1 to Gn can be appropriately adjusted.

The respective pixels R, G, and B are arranged to partially overlap gate lines of a previous stage G1 to Gn−1. The respective pixels R, G, and B are arranged between the data lines D1 to Dm, overlapping the previous gate lines G1 to Gn−1 at their central portions.

The gate lines overlapped with the respective pixels R, G, and B are the previous gate lines G1 to Gn−1, by which previous frame pixels R, G, and B are driven. A storage capacitor is formed by the previous gate lines G1 to Gn−1 and the overlapped pixels R, G, and B. That is to say, the respective gate lines G1 to Gn−1 operate the previous frame pixels R, G, and B, serving as storage electrodes of next frame pixels R, G, and B, and blocking electrodes S1 to Si−1 are formed between each of the respective pixels R, G, and B. The blocking electrodes S1 to Si−1 control liquid crystal molecules boundary areas between each of the pixels R, G, and B, thereby suppressing occurrence of image sticking. The blocking electrodes S1 to Si−1 will be later described in detail.

Figure 2:
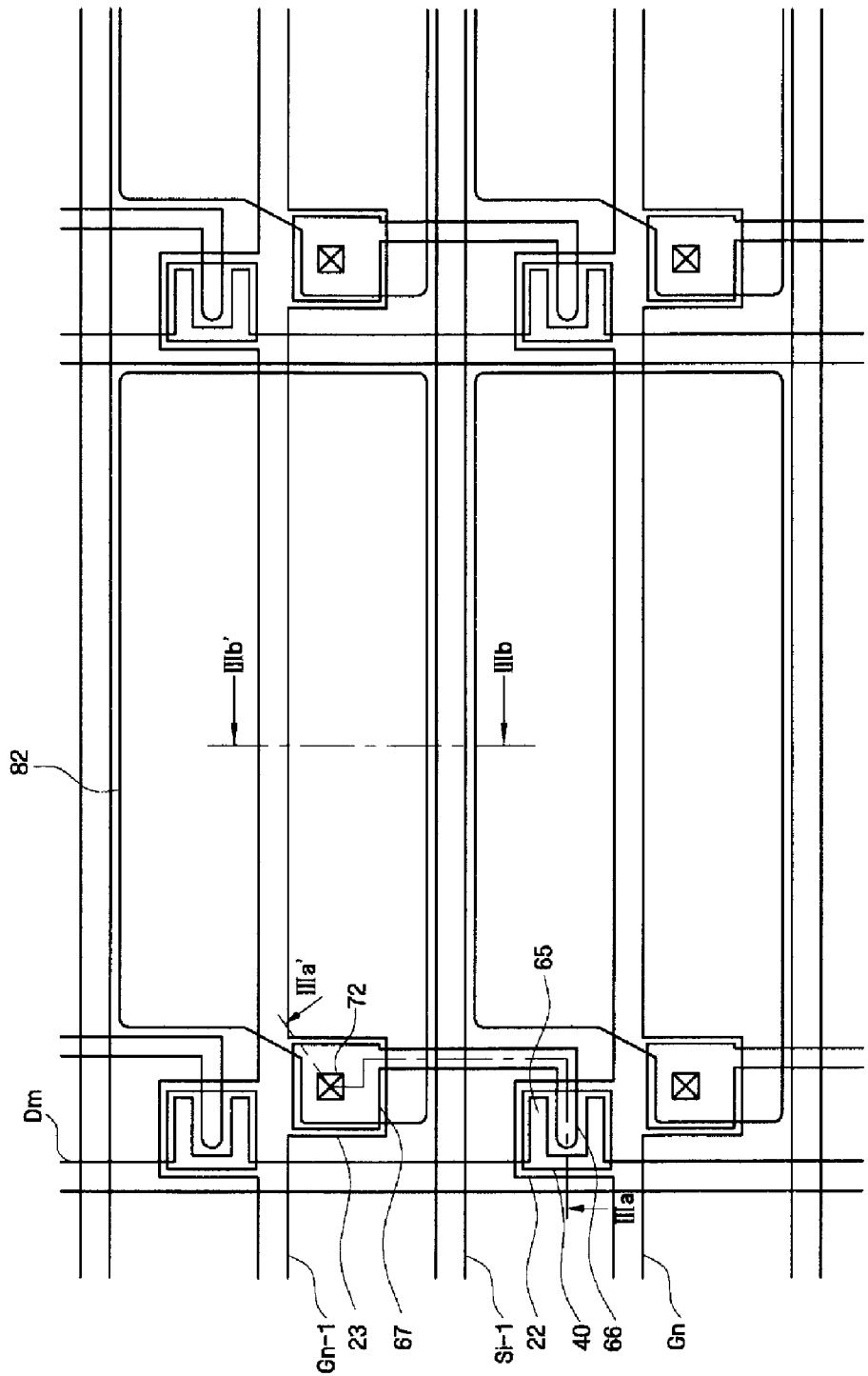
FIG. 2 is a layout view of a thin-film transistor (TFT) substrate of the liquid crystal display, according to an embodiment of the present invention.

Hereinafter, the TFT substrate included in the LCD, according to an embodiment of the present invention, will be described with reference to FIGS. 2 through 3B. FIG. 2 is a layout view of a thin-film transistor (TFT) substrate of the liquid crystal display, according to an embodiment of the present invention, FIG. 3A is a cross-sectional view of the TFT substrate taken along a line IIIa-IIIa' of FIG. 2, and FIG. 3B is a cross-sectional view of the TFT substrate taken along a line IIIb-IIIb' of FIG. 2, according to an embodiment of the present invention.

Figure 3A:
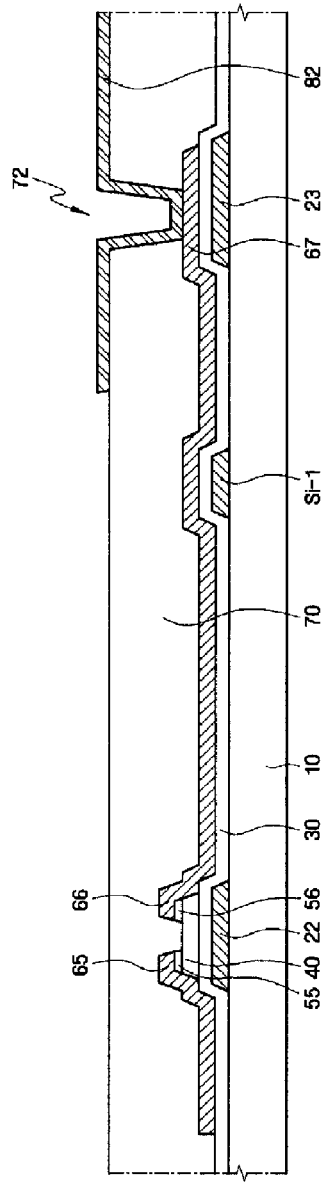
FIG. 3A is a cross-sectional view of the TFT substrate taken along a line IIIa-IIIa' of FIG. 2, according to an embodiment of the present invention.
Figure 3B:
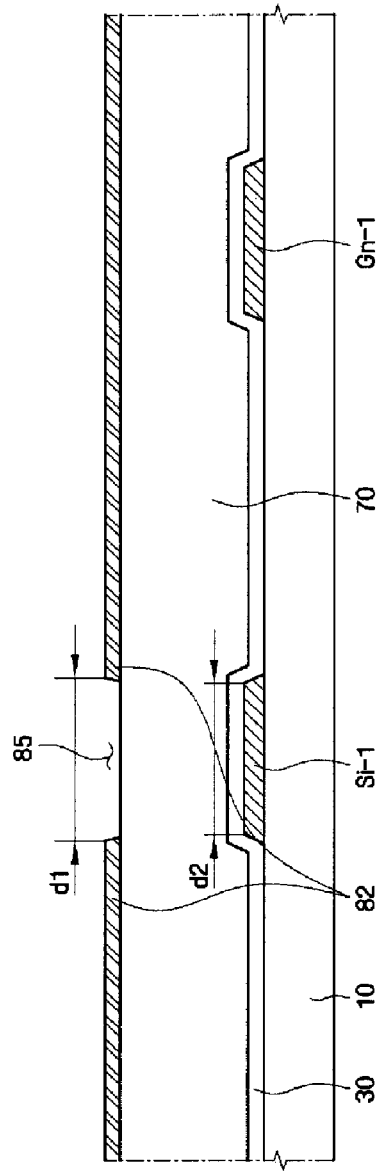
FIG. 3B is a cross-sectional view of the TFT substrate taken along a line IIIb-IIIb' of FIG. 2, according to an embodiment of the present invention.

Referring to FIGS. 2 and 3A, a plurality of gate lines Gn−1 and Gn extending in parallel with each other in a transverse direction are formed on an insulating substrate 10, and a protrusion-typed gate electrode 22 and a storage extension 23 are formed on the gate lines Gn−1 and Gn. The gate electrode 22 becomes one terminal of a thin film transistor (TFT), and the storage extension 23 overlaps a pixel electrode 82 to form a storage capacitor, as described in greater detail herein. The storage capacitor may also be formed between the storage extension 23 and the pixel electrode 82, or between the gate line Gn−1, Gn and the pixel electrode 82. Here, the gate line Gn−1, Gn may be used to apply a gate signal to the TFT to drive the TFT and to form a storage capacitor in cooperation with a next frame pixel electrode 82.

A gate-on signal in the form of a pulse may be applied to the gate line Gn−1, Gn, and a gate-off signal is sustained until a next frame starts. Here, a storage capacitor is formed between the gate lines Gn−1 and Gn, to which the gate-off signal is applied, and the pixel electrode 82, allowing the pixel electrode 82 to be sustained at a constant voltage for one frame. In one aspect, the gate lines Gn−1 and Gn used as storage electrodes should be capable of operating TFTs and have the gate-off signal applied thereto. Accordingly, the previous gate line Gn−1 overlapping the pixel electrode 82 serves a storage electrode.

The gate lines Gn−1 and Gn, the gate electrode 22 and the storage extension 23 are collectively referred to herein as gate wiring. The gate wiring may be made of an aluminum (Al)-based metal, such as Al or an Al alloy, a silver (Ag)-based metal, such as Ag or an Ag alloy, a copper (Cu)-based metal such as Cu or a Cu alloy, a molybdenum (Mo)-based metal, such as Mo or a Mo alloy, chrome (Cr), titanium (Ti), tantalum (Ta), or some combination thereof, without departing from the scope of the present invention.

The gate wiring may also have a multi-layered structure including two conductive films (not shown) having different physical characteristics. One of the two conductive films is preferably made of low resistivity metal including Al-based metal, Ag-based metal, or Cu-based metal for reducing signal delay or voltage drop in the gate wiring. The other film is preferably made of material, such as Cr, Mo, Mo alloy, Ta, or Ti, which has good electrical contact characteristics with other materials, such as indium tin oxide (ITO) or indium zinc oxide (IZO). In one aspect, a combination of the two film materials is a double layer comprised of a chromium lower layer and an aluminum upper layer, or an aluminum lower layer and a molybdenum upper layer. However, the gate wiring can be made of various metals or conductors besides the materials described above.

A gate insulating film 30 is formed on the gate wiring. A semiconductor layer 40 made of hydrogenated amorphous silicon ("a-Si") or poly-silicon is formed on the gate insulating layer 30. The semiconductor layer 40 may have various shapes, including an island, a stripe, and so on. In the present embodiment, for example, the semiconductor layer 40 is formed in an island shape on the gate electrode 22. In one aspect, if the semiconductor layer 40 is formed in a stripe shape, it may be disposed under the data line Dm to extend over the gate electrode 22.

Ohmic contact layers 55 and 56 made of silicide or n+ hydrogenated a-Si heavily doped with n-type impurity are formed on the semiconductor layer 40. The ohmic contact layers 55 and 56 may have various shapes, such as an island shape or a stripe shape, and for example, the ohmic contact layers 55 and 56 are disposed under the drain electrode 66 and the source electrode 65, as shown in the present embodiment, but an ohmic contact stripe may be extended under the data line Dm.

The data line Dm and the drain electrode 66 are formed on the ohmic contact layers 55 and 56 and the gate insulating layer 30. The data line Dm extends in a longitudinal direction and crosses the gate line 22 to define a pixel. The source electrode 65 extends like a branch from the data line 66 onto the semiconductor layer 40. The drain electrode 66 is separated from the source electrode 65 and disposed over the gate electrode 22 to face the source electrode 65. The drain electrode 66 includes a drain electrode extension 67 that extends from an upper portion of the semiconductor layer 40 and is connected to the pixel electrode 82 and a contact hole 72. The drain electrode 66 may be formed to partially overlap the previous gate line Gn−1 across the blocking electrode Si−1. The previous gate line Gn−1 may include a storage extension 23 having one end with a wide width, and the drain electrode extension 67 overlaps the storage extension 23, forming a storage capacitor.

The data line Dm, the source electrode 65, and the drain electrode 66 are collectively called data wiring. The data wiring is preferably made of a refractory metal, such as chromium, molybdenum-based metal, tantalum, or titanium, and has a multi-layered structure comprised of a refractory metal lower layer (not shown) and a low-resistance upper layer (not shown). For example, the multi-layered structure may be a dual-layer structure made of a chromium or molybdenum lower layer and an aluminum upper layer, or a triple-layer structure made of a molybdenum lower layer, an aluminum middle layer, and a molybdenum upper layer.

A portion of the source electrode 65 at least overlaps the semiconductor layer 40, and the drain electrode 66 opposes the source electrode 65 with respect to the gate electrode 26 and at least overlaps the semiconductor layer 40. Here, in one aspect, the ohmic contact layers 55 and 56 are interposed only between the underlying semiconductor layer 40 and the overlying source and drain electrodes 65 and 66 thereon and reduce the contact resistance therebetween.

A passivation layer 70 is formed on the data line Dm, the source electrode 65, the drain electrode 66, and the exposed semiconductor layer 40. The passivation layer 70 is formed of an inorganic matter, such as silicon nitride or silicon oxide, an organic matter having photosensitivity and superior planarization characteristics, or a low-k dielectric material formed by plasma enhanced chemical vapor deposition (PECVD), such as a-Si:C:O or a-Si:O:F. The passivation layer 70 may comprise a lower inorganic layer and an upper organic layer to protect exposed portions of the semiconductor layer 40 while taking advantage of the superior characteristics of the organic layer. In addition, a red, green, or blue color filter layer may be used as the passivation layer 70. In the present embodiment, the passivation layer 70 having a signal-layer structure is described as an example.

The passivation layer 70 has a contact hole 72 exposing the drain electrode 66. The pixel electrode 82 that is shaped as a rectangle long in a horizontal direction, conforming to the shape of a pixel, is disposed on the passivation layer 70. The pixel electrode 82 is electrically connected to the drain electrode extension 67 by the contact hole 72.

The pixel electrode 82 may be physically and electrically connected to the drain electrode 66 through the contact hole 72 and receives a data voltage from the drain electrode 66. The pixel electrode 82 overlaps at least a portion of the previous gate line Gn−1. In particular, the gate lines Gn−1 and Gn cross the data line Dm in a matrix type, thereby defining a pixel area. Here, the pixel area means an area where the pixel electrode 82 is formed and the transmittance of light incident from below the pixel electrode 82.

Accordingly, the pixel area is not restricted to an area surrounded by the gate lines Gn−1 and Gn and the data line Dm. That is to say, the pixel area can be defined in various manners according to the arrangement of the pixel electrode 82. For example, as shown in FIG. 2, the pixel electrode 82 may be formed to overlap the previous gate line Gn−1 and may be divided by the previous gate line Gn−1. In this case, the pixel area includes all areas having the pixel electrode 82 divided at both sides of the gate lines Gn−1 and Gn.

An alignment film (not shown) for aligning a liquid crystal layer may be coated on the pixel electrodes 82 and the passivation layer 70. Referring to FIGS. 2 and 3B, the blocking electrode Si−1 is formed between the pixel electrode 82 and its adjacent pixel electrode 82. In one aspect, the blocking electrode Si−1 is provided to eliminate or at least reduce interference due to an electrical field generated between neighboring pixel electrodes 82, thereby preventing the pixel electrode 82 from being affected by its adjacent pixel electrode 82.

The blocking electrode Si−1 is formed between the gate lines Gn−1 and Gn and extends horizontally in parallel with each other. The blocking electrode Si−1 may be simultaneously formed using the same process with the gate lines Gn−1 and Gn.

The blocking electrodes S1 and Si−1 may be spaced apart from each other and disposed in parallel with the gate lines Gn−1 and Gn. The blocking electrode Si−1 and the data line Dm are insulated by the gate insulating layer 30 and cross each other to be arranged in a matrix configuration. The pixel area is substantially defined by an area surrounded by the blocking electrode S1 and Si−1 and the data line Dm, that is, e.g., an area formed at a space corresponding to the matrix configuration comprised of the blocking electrode S1 and Si−1 and the data line Dm.

Assuming that a distance between the neighboring pixel electrodes 82 spaced apart from each other by the blocking electrode Si−1 is referred to as a spacing 85, a width d2 of the blocking electrode Si−1 is equal to or smaller than a width d1 of the spacing 85. In a case where the blocking electrode Si−1 is made of the same material as the gate wiring, it may be formed as an opaque metal layer. Since the blocking electrode Si−1 is capable of blocking light, an aperture ratio of the LCD can be reduced by increasing the width d2 of the blocking electrode Si−1 relative to the width d1 of the spacing 85.

Meanwhile, in one aspect, the blocking electrode Si−1 may be supplied with a direct-current (DC) voltage. That is to say, since the voltage applied to a common electrode 140 is a DC voltage, the blocking electrode Si−1 is supplied with the same DC voltage as that applied to the common electrode 140, thereby avoiding generating a voltage difference between the common electrode 140 and the blocking electrode Si−1. Here, the DC voltage applied to the blocking electrode Si−1 may be the same as that applied to the common electrode 140, that is, a common voltage. Examples of the common voltage may include a DC voltage, a common voltage, or 0 V.

The blocking electrode Si−1 and the common electrode 140, as described in greater detail herein, are supplied with the same voltage, thereby vertically orienting liquid crystal molecules with respect to a thin film transistor (TFT) substrate 100. Behaviors of the liquid crystal molecules based on the blocking electrode Si−1 and the common electrode 140 are described in greater detail herein.

Figure 4:
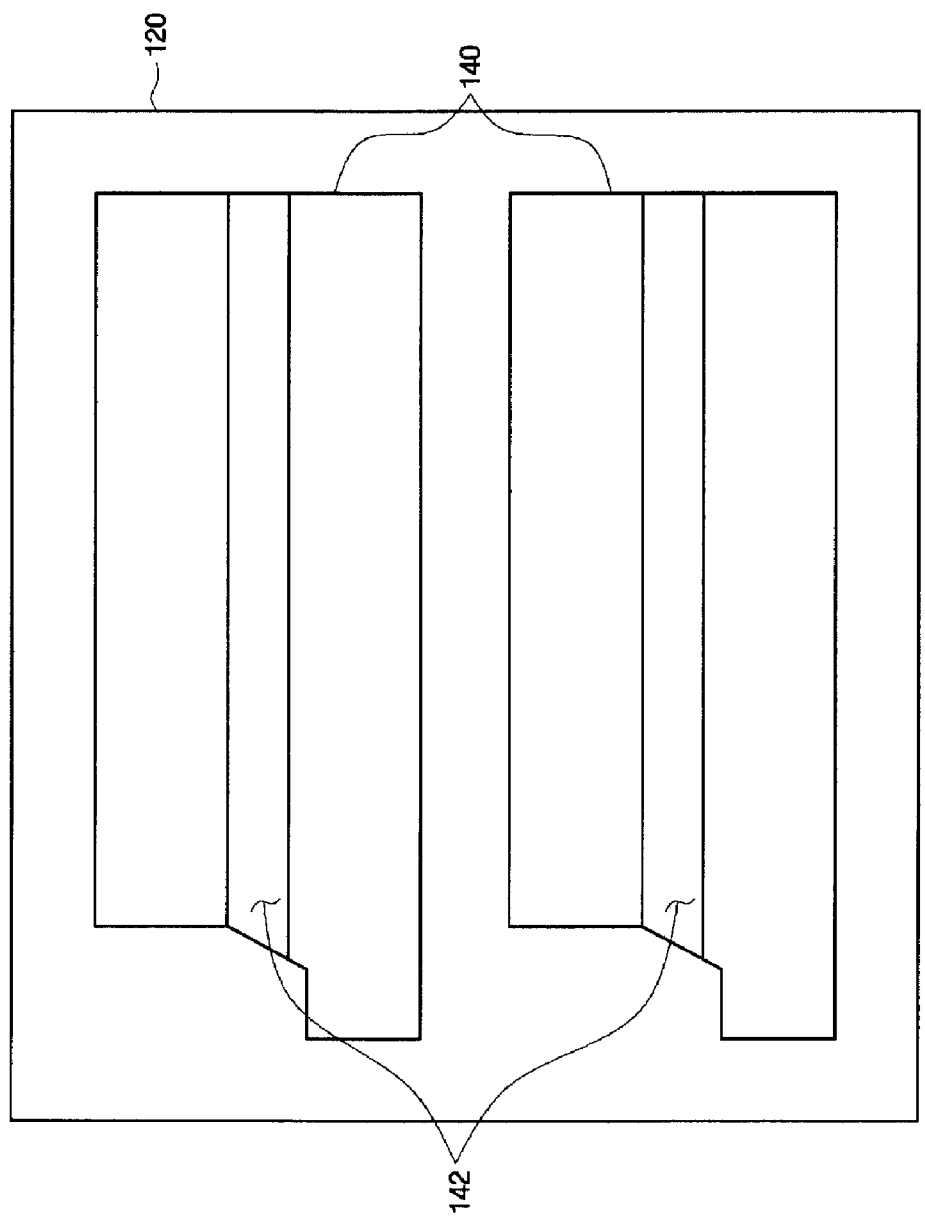
FIG. 4 is a layout view of a common electrode substrate of the liquid crystal display, according to an embodiment of the present invention.
Figure 5:
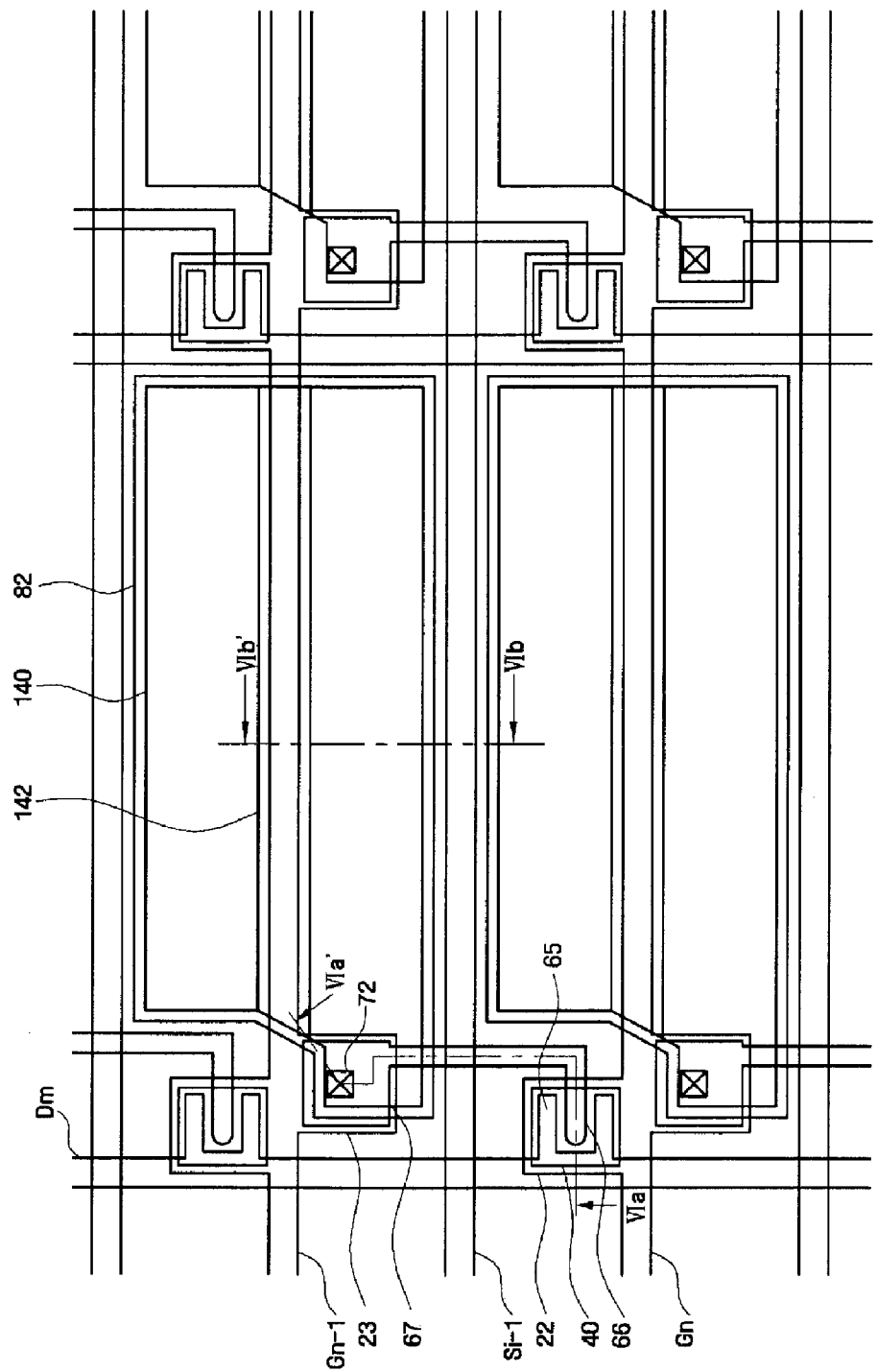
FIG. 5 is a layout view of a liquid crystal display including the TFT substrate shown in FIG. 2 and the common electrode substrate shown in FIG. 4, according to an embodiment of the present invention.
Figure 6A:
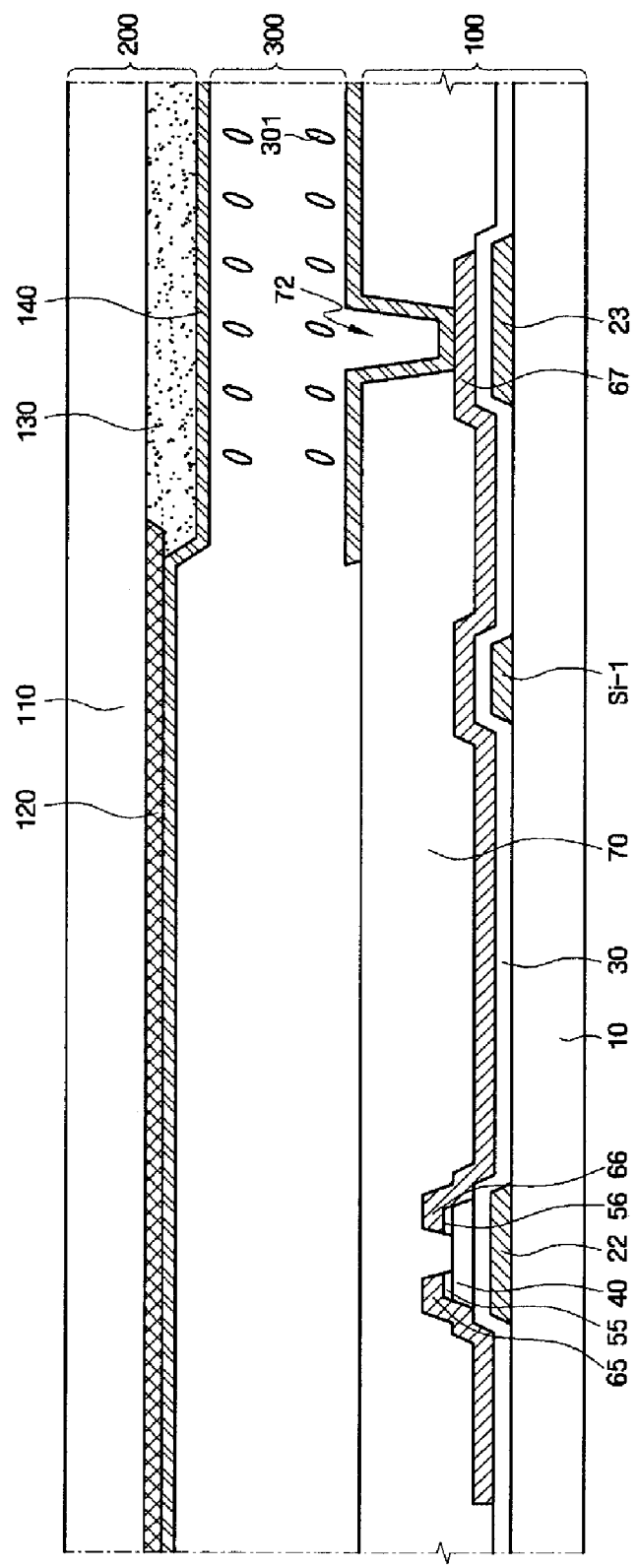
FIG. 6A is a cross-sectional view of the liquid crystal display taken along a line VIa-VIa' of FIG. 5, according to an embodiment of the present invention.
Figure 6B:
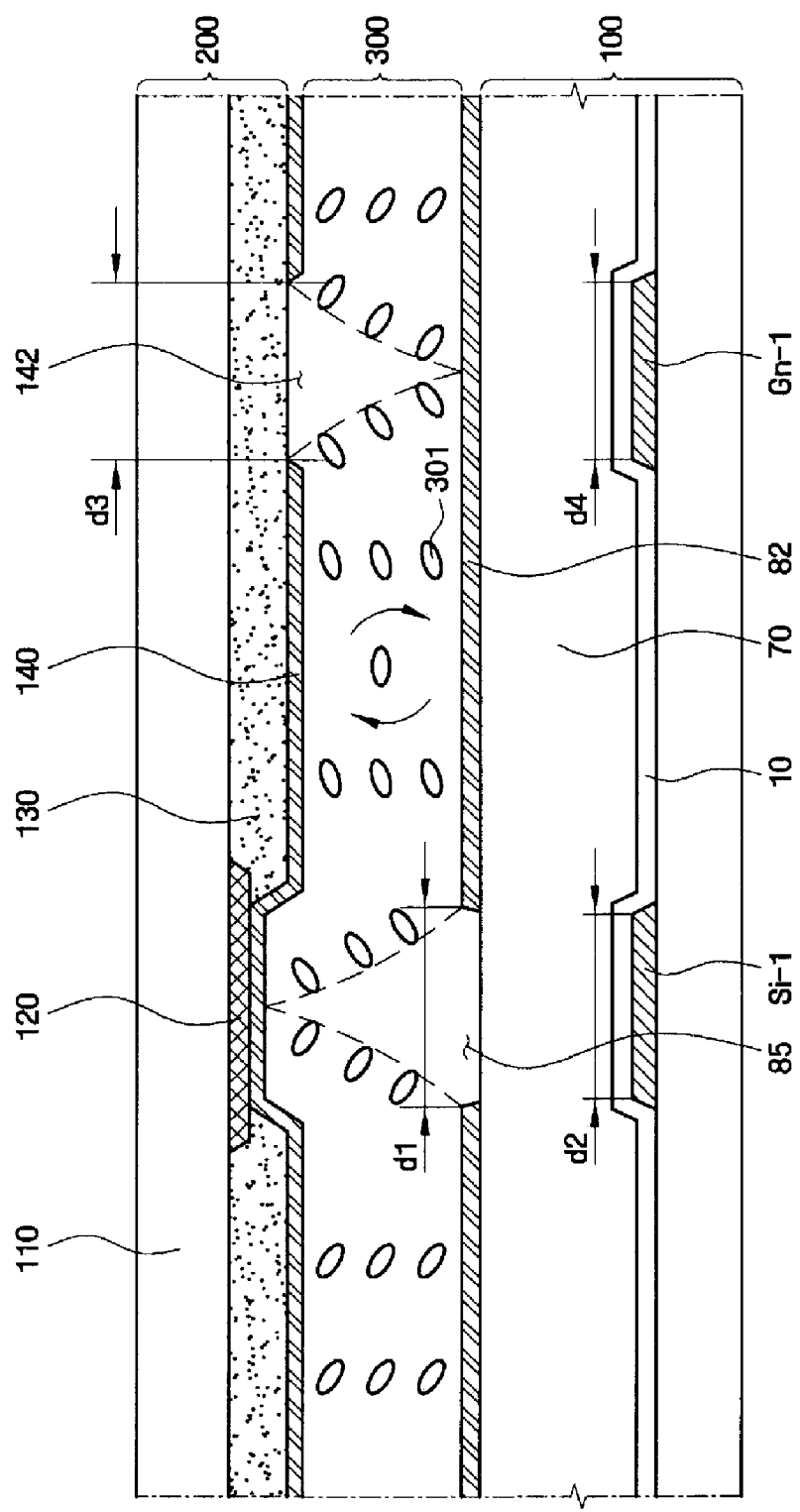
FIG. 6B is a cross-sectional view of the liquid crystal display taken along a line VIb-VIb' of FIG. 5, according to an embodiment of the present invention.

Hereinafter, a common electrode substrate of the liquid crystal display, according to an embodiment of the present invention, will be described with reference to FIGS. 4 through 6B. In particular, FIG. 4 is a layout view of a common electrode substrate of the liquid crystal display, according to an embodiment of the present invention. FIG. 5 is a layout view of a liquid crystal display including the TFT substrate shown in FIG. 2 and the common electrode substrate shown in FIG. 4, according to an embodiment of the present invention. FIG. 6A is a cross-sectional view of the liquid crystal display taken along a line VIa-VIa' of FIG. 5, according to an embodiment of the present invention. FIG. 6B is a cross-sectional view of the liquid crystal display taken along a line VIb-VIb' of FIG. 5, according to an embodiment of the present invention.

Referring to FIGS. 4, 6A, and 6B, black matrixes 120 for preventing light leakage is formed on an insulating substrate 110, which is made of a transparent insulating material, such as glass. The black matrixes 120 are positioned on areas overlapping the blocking electrode Si−1 and the data line Dm disposed on the TFT substrate 100.

Pixel areas are formed between each of the black matrixes 120, and color filters 130 are formed on the pixel areas. The color filters 130 include a red (R) color filter, a green (G) color filter, and a blue (B) color filter sequentially arranged along the data line Dm formed on the TFT substrate 100. The common electrode 140, which is made of a transparent conductive material, such as indium tin oxide (ITO) or indium zinc oxide (IZO), is formed over the color filters 130. The common electrode 140 forms an electric field together with the pixel electrodes formed on the TFT substrate 100 and adjusts behaviors of liquid crystal materials. A cutout pattern 142 is formed on the common electrode 140.

The cutout pattern 142 is formed in a shape of a slit by cutting a portion of the common electrode 140. The cutout pattern 142 is used to form domains and can determine the tilt direction of liquid crystal molecules. Here, in one embodiment, the cutout pattern 142 is only provided as an domain formation means. In another embodiment, a protrusion pattern may be formed instead of the cutout pattern 142.

The cutout pattern 142 may be formed to overlap the gate lines Gn−1 and Gn. That is to say, since the gate lines Gn−1 and Gn are formed across the central portion of the pixel electrode 82, the cutout pattern 142 is made to overlap the gate lines Gn−1 and Gn, thereby dividing the pixel area into two domains with respect to the gate lines Gn−1 and Gn. As previously described, domains are formed with respect to the gate lines Gn−1 and Gn and liquid crystal molecules are tilted perpendicular to the gate lines Gn−1 and Gn, thereby improving horizontal visibility of the LCD.

As in the LCD, according to the first embodiment of the present invention, when the pixel electrode 82 is long in a horizontal direction, the LCD is suitably used for a horizontally elongated display device, like a widescreen TV. The black matrixes 120 are positioned at areas overlapping the blocking electrode Si−1 and the data line Dm to cover the blocking electrode Si−1 and the data line Dm disposed on the TFT substrate 100. In one aspect, the alignment film (not shown) for aligning liquid crystal molecules may be coated over the common electrode 140.

As shown in FIGS. 5 and 6A, a common electrode substrate 200 is aligned with the aforementioned TFT substrate 100 and combined with each other. A liquid crystal layer 300 is formed between the TFT substrate 100 and the common electrode substrate 200, thereby completing the LCD, according to the present embodiment of the present invention.

In an initial alignment state in which no electric field is applied, the liquid crystal layer 300 is vertically aligned with respect to the TFT substrate 100 and the common electrode substrate 200. As described above, upon application of an electric field, the liquid crystal molecules 301 vertically aligned in the absence of an electric field are tilted to the cutout pattern 142.

Referring to FIG. 6B, when there is an electric field applied between the pixel electrode 82 and the common electrode 140, the liquid crystal molecules 301 are tilted to the cutout pattern 142. In one aspect, an image on an LCD can be perceived by the light that has passed through the liquid crystal layer 300 between the cutout pattern 142 and the spacing 85. The black matrixes 120 or the gate line Gn−1 may prevent light from passing through the liquid crystal layer 300 positioned on the cutout pattern 142 and the spacing 85 so as not to be viewed. Here, a width d3 of the cutout pattern 142 may be greater than that d3 of the gate line Gn−1.

If a voltage is applied to the pixel electrode 82 and the common electrode 140, an electric field is generated between the pixel electrode 82 and the common electrode 140, so that the liquid crystal molecules 301 are tilted along the electric field. Here, if the same voltage as the voltage applied to the common electrode 140 is applied to the blocking electrode Si−1 overlapping the spacing 85 of the pixel electrode 82, the blocking electrode Si−1 and the common electrode 140 are kept at the initial state in which there is no electric field. That is to say, no voltage difference is generated between the common electrode 140 and the blocking electrode Si-1, so that the liquid crystal molecules 301 are kept to be vertically aligned.

In column inversion driving of the LCD, since the liquid crystal molecules 301 are kept vertically aligned between the blocking electrode Si-1 and the common electrode 140, occurrence of image sticking at the boundary of the pixel electrode 82 can be prevented even if the same voltage is applied to neighboring electrodes 82.

In addition to the basic structure, the liquid crystal display may further include one or more polarizing plates, a backlight, and so on. The polarizing plates (not shown) may be provided on both sides of the basic panel and the transmission axes thereof may be disposed to be perpendicular to each other.

Figure 8:
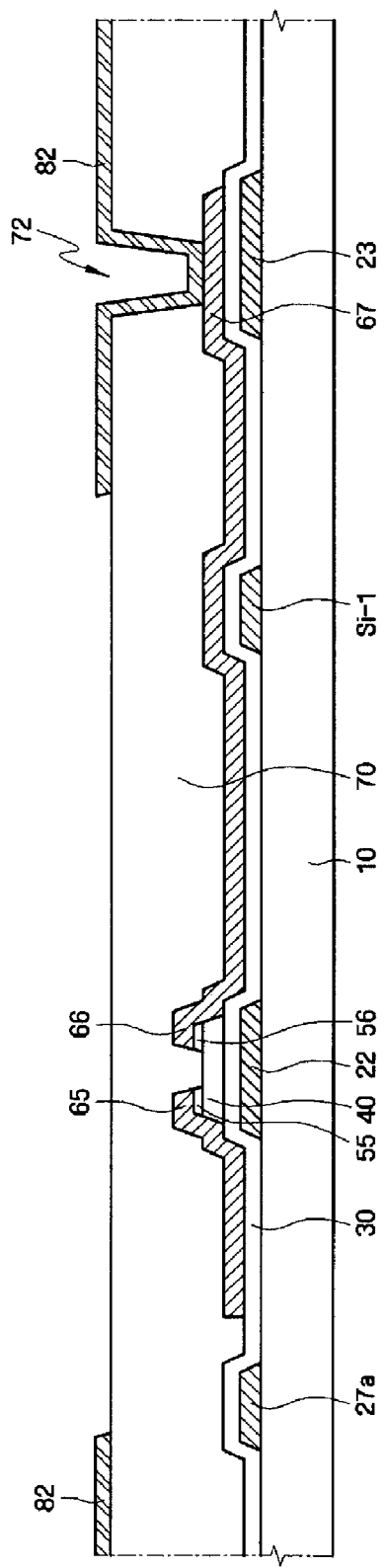
FIG. 8 is a cross-sectional view of the TFT substrate taken along a line VIII-VIII' of FIG. 2, according to an embodiment of the present invention.

Hereinafter, an LCD according to another embodiment of the present invention will be described with reference to FIGS. 7 and 8. FIG. 7 is a layout view of a TFT substrate, according to another embodiment of the present invention, and FIG. 8 is a cross-sectional view of the TFT substrate taken along a line VIII-VIII' of FIG. 2. For illustrative convenience, elements identical to those in the previous embodiment are indicated by identical reference numerals, and a description thereof will not be omitted or simplified.

The LCD according to another embodiment of the present invention includes a blocking electrode Si-1 extending along a data line Dm. Gate lines Gn-1 and Gn extending in a transverse direction and the data line Dm extending in a longitudinal direction are arranged in a matrix configuration on a first insulating substrate 10. Here, in one aspect, blocking electrodes Si-2 and Si-1 are arranged in parallel with each other between the gate lines Gn-1 and Gn.

The blocking electrodes Si-2 and Si-1 may be formed to surround the pixel electrode 82 to eliminate interference between the pixel electrode 82 and its adjacent pixel electrode 82, thereby preventing the pixel electrode 82 from being affected by its adjacent pixel electrode 82. In particular, each of the blocking electrodes Si-2 and Si-1 may include first to third extending portions 27a, 27b, and 27c extending between the pixel electrode 82 and the data line Dm.

The first extending portion 27a and the second extending portion 27b are branched in a longitudinal direction of the blocking electrodes Si-2 and Si-1 and extend between the pixel electrode 82 and the data line Dm. The first extending portion 27a and the second extending portion 27b may extend in opposite directions with respect to the blocking electrodes Si-2 and Si-1.

The first extending portion 27a and the second extending portion 27b extend to be adjacent to the gate lines Gn-1 and Gn. Here, a distance between the blocking electrode Si-2 adjacent to the second extending portion 27b of the blocking electrode Si-1 and the first extending portion 27a may be a bit greater than a width between the gate lines Gn-1 and Gn. Meanwhile, the third extending portion 27c may be formed between the data line Dm and the storage extension 23.

The first to third extending portions 27a, 27b and 27c may be optionally used. For example, in a case where a distance between the storage extension 23 and the blocking electrode Si-2 or Si-1 is short, the third extending portion 27c may not be used.

Alternatively, one of the first extending portion 27a and the second extending portion 27b may not be used. The first to third extending portions 27a, 27b and 27c may be selectively formed in consideration of the distance between the gate lines Gn-1 and Gn and the distance between each of the blocking electrodes Si-2 and Si-1 and each of the gate lines Gn-1 and the Gn.

In the same manner, the first to third extending portions 27a, 27b and 27c may extend to the blocking electrodes Si-2 and Si-1, thereby preventing the image sticking phenomenon in line inversion frame inversion driving of the LCD.

While embodiments of the present invention have been particularly shown and described with reference to various embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A thin film transistor (TFT) substrate comprising:
an insulating substrate;
a plurality of gate lines including a plurality of gate electrodes;
a plurality of data lines perpendicular to the gate lines;
a plurality of thin film transistors each electrically connected to the gate lines and to the data lines;
a plurality of pixel electrodes each connected to the thin film transistors and partially overlapping a previous gate line; and
a blocking electrode formed between adjacent pixel electrodes and extending parallel with the gate lines,
wherein the previous gate line overlaps a central portion of the pixel electrode.

2. The TFT substrate of claim 1, wherein the blocking electrode is configured to supply a common voltage.

3. The TFT substrate of claim 2, wherein each drain electrode of the thin film transistors traverses the blocking electrode formed between adjacent gate lines and connected to one of the plurality of pixel electrodes.

4. The TFT substrate of claim 3, wherein the blocking electrode is formed of a same layer as the plurality of gate lines.

5. The TFT substrate of claim 2, wherein the blocking electrode is formed of a same layer as the plurality of gate lines.

6. The TFT substrate of claim 1, wherein each drain electrode of the thin film transistors traverses the blocking electrode formed between adjacent gate lines and connected to one of the plurality of pixel electrodes.

7. The TFT substrate of claim 6, wherein the blocking electrode is formed of a same layer as the plurality of gate lines.

8. The TFT substrate of claim 1, wherein the blocking electrode is formed of a same layer as the plurality of gate lines.

9. A liquid crystal display comprising:
a first insulating substrate;
a plurality of gate lines including a plurality of gate electrodes;
a plurality of data lines perpendicular to the gate lines;
a plurality of thin film transistors each electrically connected to the gate lines and to the data lines;
a plurality of pixel electrodes each connected to the thin film transistors and partially overlapping a previous gate line;
a blocking electrode formed between adjacent pixel electrodes and extending parallel with the gate lines;
a second insulating substrate disposed to face the first insulating substrate;
a common electrode formed on the second insulating substrate; and a liquid crystal layer interposed between the first insulating substrate and the second insulating substrate, wherein the previous gate line overlaps a central portion of the pixel electrode.

10. The liquid crystal display of claim 9, further comprises a common electrode having a cutout pattern overlapping a pixel area, wherein the cutout pattern overlaps the gate line, and wherein a width of the cutout portion is equal to or greater than a width of the gate lines.

11. The liquid crystal display of claim 10, wherein the blocking electrode is configured to supply a common voltage.

12. The liquid crystal display of claim 11, wherein each drain electrode of the thin film transistors traverses the blocking electrode formed between adjacent gate lines and connected to one of the plurality of pixel electrodes.

13. The liquid crystal display of claim 12, wherein the blocking electrode is formed of a same layer as the plurality of gate lines.

14. The liquid crystal display of claim 11, wherein the blocking electrode is formed of a same layer as the plurality of gate lines.

15. The liquid crystal display of claim 10, wherein each drain electrode of the thin film transistors traverses the blocking electrode formed between adjacent gate lines and connected to one of the plurality of pixel electrodes.

16. The liquid crystal display of claim 15, wherein the blocking electrode is formed of a same layer as the plurality of gate lines.

17. The liquid crystal display of claim 10, wherein the blocking electrode is formed of a same layer as the plurality of gate lines.

18. The liquid crystal display of claim 9, wherein the blocking electrode is configured to supply a common voltage.

19. The liquid crystal display of claim 18, wherein each drain electrode of the thin film transistors traverses the blocking electrode formed between adjacent gate lines and connected to one of the plurality of pixel electrodes.

20. The liquid crystal display of claim 19, wherein the blocking electrode is formed of a same layer as the plurality of gate lines.

21. The liquid crystal display of claim 18, wherein the blocking electrode is formed of a same layer as the plurality of gate lines.

22. The liquid crystal display of claim 9, wherein each drain electrode of the thin film transistors traverses the blocking electrode formed between adjacent gate lines and connected to one of the plurality of pixel electrodes.

23. The liquid crystal display of claim 22, wherein the blocking electrode is formed of a same layer as the plurality of gate lines.

24. The liquid crystal display of claim 9, wherein the blocking electrode is formed of a same layer as the plurality of gate lines.

25. A liquid crystal display comprising:
a first insulating substrate;
a plurality of gate lines including a plurality of gate electrodes;
a plurality of data lines perpendicular to the gate lines;
a plurality of thin film transistors each electrically connected to the gate lines and to the data lines;
a plurality of pixel electrodes each connected to the thin film transistors and partially overlapping a previous gate line;
a blocking electrode formed between adjacent pixel electrodes and extending parallel with the gate lines;
a second insulating substrate disposed to face the first insulating substrate;
a common electrode formed on the second insulating substrate; and
a liquid crystal layer interposed between the first insulating substrate and the second insulating substrate,
wherein the blocking electrode is formed of a same layer as the plurality of gate lines.

26. The liquid crystal display of claim 25, further comprises a common electrode having a cutout pattern overlapping a pixel area, wherein the cutout pattern overlaps the gate line, and wherein a width of the cutout portion is equal to or greater than a width of the gate lines.

27. The liquid crystal display of claim 26, wherein the blocking electrode is configured to supply a common voltage.

28. The liquid crystal display of claim 27, wherein each drain electrode of the thin film transistors traverses the blocking electrode formed between adjacent gate lines and connected to one of the plurality of pixel electrodes.

29. The liquid crystal display of claim 26, wherein each drain electrode of the thin film transistors traverses the blocking electrode formed between adjacent gate lines and connected to one of the plurality of pixel electrodes.

30. The liquid crystal display of claim 25, wherein the blocking electrode is configured to supply a common voltage.

31. The liquid crystal display of claim 30, wherein each drain electrode of the thin film transistors traverses the blocking electrode formed between adjacent gate lines and connected to one of the plurality of pixel electrodes.

32. The liquid crystal display of claim 25, wherein each drain electrode of the thin film transistors traverses the blocking electrode formed between adjacent gate lines and connected to one of the plurality of pixel electrodes.

33. A thin film transistor (TFT) substrate comprising:
an insulating substrate;
a plurality of gate lines including a plurality of gate electrodes;
a plurality of data lines perpendicular to the gate lines;
a plurality of thin film transistors each electrically connected to the gate lines and to the data lines;
a plurality of pixel electrodes each connected to the thin film transistors and partially overlapping a previous gate line; and
a blocking electrode formed between adjacent pixel electrodes and extending parallel with the gate lines,
wherein the blocking electrode is formed of a same layer as the plurality of gate lines.

34. The TFT substrate of claim 33, wherein the blocking electrode is configured to supply a common voltage.

35. The TFT substrate of claim 34, wherein each drain electrode of the thin film transistors traverses the blocking electrode formed between adjacent gate lines and connected to one of the plurality of pixel electrodes.

36. The TFT substrate of claim 33, wherein each drain electrode of the thin film transistors traverses the blocking electrode formed between adjacent gate lines and connected to one of the plurality of pixel electrodes.

* * * * *